US012240017B2

(12) United States Patent
Anderle et al.

(10) Patent No.: US 12,240,017 B2
(45) Date of Patent: Mar. 4, 2025

(54) SORTING METHOD AND SORTING DEVICE

(71) Applicant: Festo SE & Co. KG, Esslingen (DE)

(72) Inventors: Jens Anderle, Deggingen (DE); Heiko Kühbauch, Köngen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/018,130

(22) PCT Filed: Jul. 28, 2020

(86) PCT No.: PCT/EP2020/071309
§ 371 (c)(1),
(2) Date: Jan. 26, 2023

(87) PCT Pub. No.: WO2022/022814
PCT Pub. Date: Feb. 3, 2022

(65) Prior Publication Data
US 2023/0191458 A1 Jun. 22, 2023

(51) Int. Cl.
*B07C 5/36* (2006.01)

(52) U.S. Cl.
CPC ...... *B07C 5/368* (2013.01); *B07C 2501/0018* (2013.01); *B07C 2501/0081* (2013.01)

(58) Field of Classification Search
CPC ............ B07C 5/368; B07C 2501/0018; B07C 2501/0081
See application file for complete search history.

(56) References Cited

U.S. PATENT DOCUMENTS

2012/0037545 A1 2/2012 Van Kasteren
2018/0100810 A1* 4/2018 Sahu ..................... B07C 5/3422
2018/0163886 A1* 6/2018 Shirey ................... F16K 31/086
2019/0235533 A1* 8/2019 Lull ...................... G01F 15/003

FOREIGN PATENT DOCUMENTS

CN 105013718 A 11/2015
CN 106733721 A 5/2017
CN 110038826 A 7/2019
CN 110090818 A 8/2019
CN 107999414 B 5/2020
DE 10 2014 011 401 B3 1/2016
EP 1 967 294 A2 9/2008

OTHER PUBLICATIONS

International Search Report.
Chinese Office Action and Search Report dated Jul. 12, 2024.

* cited by examiner

*Primary Examiner* — Michael McCullough
*Assistant Examiner* — Kalyanavenkateshware Kumar
(74) *Attorney, Agent, or Firm* — Hoffmann & Baron, LLP

(57) ABSTRACT

A sorting system (10, 20) for sorting sorting objects (1), including a sensor unit (2) which is adapted to detect a property, in particular a size, shape, weight, color and/or material, of a sorting object (1), and a valve arrangement (3) which is adapted to blow on the sorting object (1) in order to convey the sorting object (1) to one of a plurality of possible sorting destinations (4), wherein the sorting system (10, 20) is adapted to selectively set, according to the detected property, a blowing strength (8) to a first blowing strength (8A) greater than zero or to a second blowing strength greater than zero, the second blowing strength being different from the first blowing strength (8B), and to blow the sorting object using the valve arrangement with the set blowing strength to cause the sorting object to be conveyed to the sorting destination.

16 Claims, 5 Drawing Sheets

SORTING METHOD AND SORTING DEVICE

This is a National Stage application based on International Application No. PCT/EP2020/071309, filed on Jul. 28, 2020.

BACKGROUND OF THE INVENTION

The invention relates to a sorting system for sorting sorting objects, the sorting system comprising a sensor unit for detecting a property, in particular a size, shape, weight, color and/or material, of a sorting object, and a valve arrangement configured to blow on the sorting object in order to convey the sorting object to one of several possible sorting destinations.

The sorting objects are, for example, bulk goods, such as foodstuffs, such as cereals, rice, potatoes, French fries or pieces of meat. The sorting system is especially designed to classify and separate the sorting objects based on the detected property. The property is in particular a physical quantity.

The sorting system is, for example, an optical sorting system that detects the size, shape, and/or color of the sorting objects as the property and sorts the sorting objects according to one or more of these properties.

For example, in the sorting system, the bulk material to be sorted is transferred over an inclined plane into a controlled free fall. A camera system of the sorting system detects as the property the size, shape and/or color of the falling sorting objects. The camera signals of the camera system are evaluated by software of the sorting system. Based on the evaluation of the camera signals, the sorting system selectively conveys each sorting object to a first sorting destination, for example a first collection bin, or to a second sorting destination, for example a second collection bin. For example, the sorting system blows the sorting objects assigned to the first sorting destination with pneumatic valves to convey them to the first sorting destination. In a conventional sorting system, the sorting system does not blow on the sorting objects assigned to the second sorting destination, so that these sorting objects fall into the second sorting destination.

The conventional sorting system has electromagnetically driven 2/2 or 3/2 switching valves that can only be set to the "open" and "closed" states. In the conventional sorting system, the blowing strength with which the sorting objects are blown on can be set to either a blowing strength greater than zero (by opening the respective switching valve) or to a blowing strength equal to zero (by closing the respective switching valve).

SUMMARY OF THE INVENTION

It is an object of the invention to provide a sorting system that can be used flexibly.

The object is solved by the sorting system according to claim 1. The sorting system is adapted to selectively set, according to the detected property, a blowing strength to a first blowing strength greater than zero or to a second blowing strength greater than zero, the second blowing strength being different from the first blowing strength and to blow the sorting object with the set blowing strength using the valve arrangement to cause the sorting object to be conveyed to the sorting destination.

The sorting system therefore has at least two different blowing strengths greater than zero available for blowing each of the sorting objects, and the sorting system can select the blowing strength to be used for each sorting object from these two blowing strengths.

Preferably, the sorting system is designed to use the at least two different blowing strengths, for example, to blow the sorting objects farther or less far. Optionally, the sorting system can be designed to use the two different blowing strengths to blow sorting objects of different weight the same distance. Furthermore, the sorting system can be designed to use the two different blowing strengths to sort the sorting objects into at least two or three different sorting destinations, in particular based on the detected property, for example the shape, color, size, weight and/or material of the sorting objects. The sorting destinations are in particular collection bins.

In particular, the present sorting system makes it possible to sort the objects to be sorted into more than two different sorting destinations in a single sorting operation due to the at least two different settable blowing strengths greater than zero. With the conventional sorting system, several sorting operations are required for this, since with the conventional sorting system only one sorting into a maximum of two different sorting destinations is possible per sorting operation.

Preferably, the sorting system comprises one or more proportional valves for blowing on the sorting objects. In particular, the sorting system comprises one or more piezo valves for blowing the sorting objects. The one or more proportional valves do not necessarily have to have a closed control loop or do not necessarily have to be operated in a closed control loop.

Advantageous further developments are the subject of the subclaims.

The invention further relates to a sorting method for sorting sorting objects, comprising the steps of: detecting a property, in particular size, shape, weight, color and/or material, of a first sorting object, and based on the detected property of the first sorting object and using a valve arrangement, first blowing of the first sorting object with a first blowing strength greater than zero to convey the first sorting object to a first sorting destination, detecting the property of a second sorting object, and based on the detected property of the second sorting object and using the valve arrangement, second blowing of the second sorting object with a second blowing strength greater than zero, the second blowing strength being different from the first blowing strength, to convey the second sorting object to a second sorting destination or to the first sorting destination.

The method is expediently carried out with the described sorting system and/or is preferably designed in correspondence with a described embodiment of the sorting system.

BRIEF DESCRIPTION OF THE DRAWINGS

Exemplary embodiments are explained below with reference to the figures.

DETAILED DESCRIPTION

Figure 1:
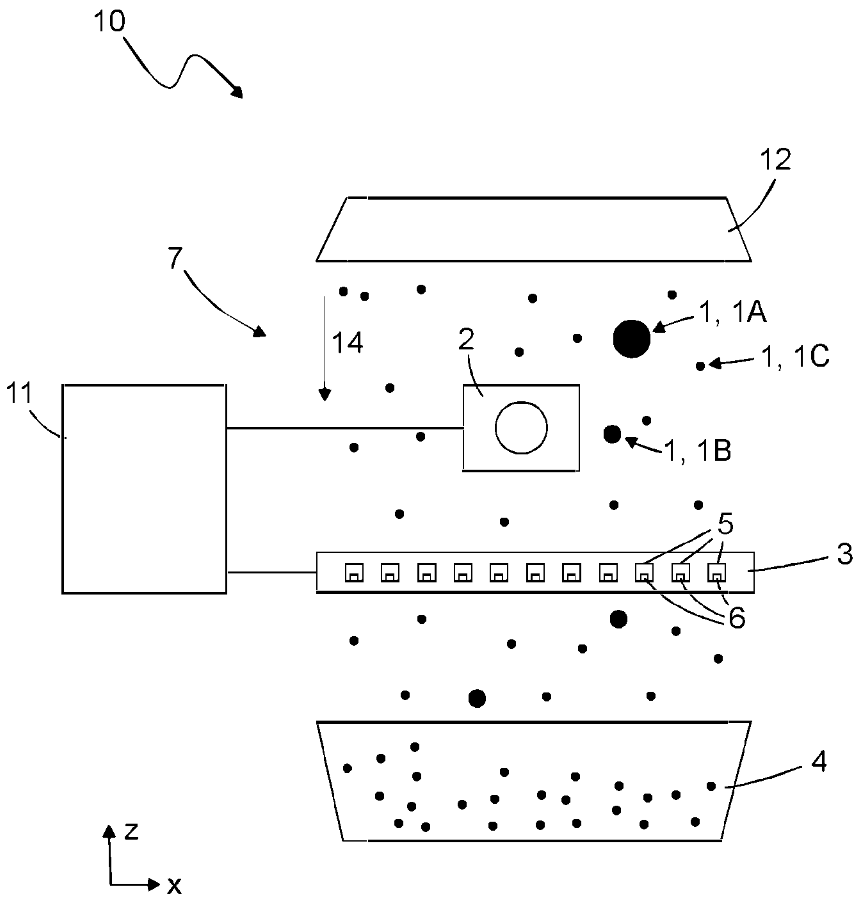
FIG. 1 shows a sorting system according to a first embodiment in a front view.
Figure 2:
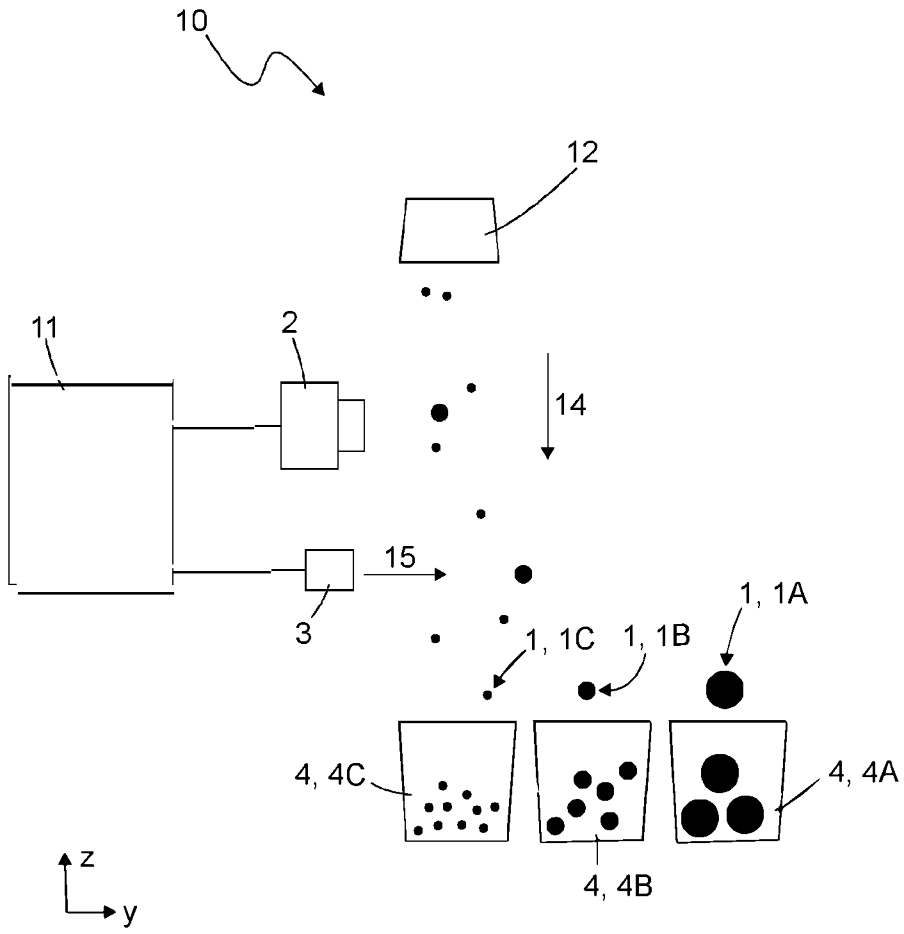
FIG. 2 shows a side view of the sorting system according to the first embodiment.

FIGS. 1 and 2 show a sorting system 10 according to a first embodiment, which is used for sorting sorting objects 1 to different sorting destinations 4.

The sorting objects 1 are exemplary bulk material, for example food, such as cereals, rice, potatoes, French fries or pieces of meat. Alternatively, the sorting objects 1 may be recycled material, for example shredded electronics or garbage. Further, the sorting objects 1 may be rocks.

Exemplarily, the sorting system 10 comprises a sorting object source 12 that provides the sorting objects 1. The sorting object source 12 is for example the output of a feeding device, for example a conveyor belt, which feeds the sorting objects 1. Exemplarily, the sorting object source 12 comprises an inclined plane that transfers the sorting objects 1 into a free fall.

The sorting system 10 expediently comprises a sorting section 7 on which the sorting objects 1 are sorted. The sorting object source 12 outputs the sorting objects 1 to the sorting section 7. Exemplarily, the sorting section 7 is a section in which the sorting objects 1 are moved by gravity. For example, the sorting section 7 is a free space section in which the sorting objects 1 fall down.

The sorting system 10 further comprises a plurality of sorting destinations 4 into which the sorting system 10 sorts the sorting objects 1. The sorting destinations 4 may also be referred to as sorting areas. The sorting destinations 4 are, for example, entrances to respective discharge devices, for example conveyor belts, with which the sorting objects are transported away after sorting. Alternatively, the sorting destinations may also be respective collection containers. Preferably, the sorting system 10 comprises a first sorting destination 4A and a second sorting destination 4B different from the first sorting destination 4A. Exemplarily, the sorting system 10 further comprises a third sorting destination 4C different from the first sorting destination 4A and the second sorting destination 4B.

The sorting system 10 is designed to sort the sorting objects 1 supplied in particular by the sorting object source 12 in order to distribute these sorting objects 1 to the various sorting destinations 4, in particular on the basis of a detected property of the sorting objects 1, preferably a detected property of each individual sorting object 1. The sorting system 10 is exemplarily designed to sort at least 100, at least 500 or at least 1000 sorting objects per minute.

The sorting system 10 comprises a sensor unit 2 for detecting the property, in particular the size, shape, weight, color and/or material of the sorting object 1, preferably of each sorting object 1. Exemplarily, the sensor unit 2 comprises an image sensor and is configured to record images of the sorting objects 1 with the image sensor. For example, the sensor unit 2 is a camera system comprising the image sensor.

Alternatively or additionally, the sensor unit may comprise a force transducer, for example a load cell, to detect as the property the weight of each sorting object 1.

The image sensor of the sensor unit 2 is preferably designed to record images over the entire width of the sorting section 7. The width of the sorting section 7 runs in particular in a horizontal direction—exemplarily the x-direction. The sorting objects 1 move along the sorting section 7 expediently in a vertical direction—exemplarily in negative z-direction. The direction in which the sorting objects 1 are conveyed along the sorting section 7 is to be referred to as the conveying direction 14. The conveying direction 14 is exemplarily the negative z-direction.

The sorting system 10 further comprises a control device 11 configured to detect the property of each sorting object 1 based on a sensor signal provided by the sensor unit 2. The sensor signal comprises, for example, the captured images of the sorting objects 1 and/or the captured weight of each sorting object. The sensor signal is, for example, a camera signal.

Preferably, the control device 11 is adapted to detect the property of each sorting object based on the sensor signal, in particular based on the captured images of the sorting objects 1. The property is, for example, the size, shape, color and/or material of each sorting object 1. Expediently, the control device 11 has software, for example image analysis software, with which the control device 11 detects the property of each sorting object 1 on the basis of the captured images. Preferably, the control device 11 detects the property of each sorting object 1 as a property value. In particular, the control device 11 provides at least one respective property value based on the sensor signal for each sorting object 1, which represents the property of the sorting object 1.

The control device 11 is designed to divide the sorting objects 1 into at least two, preferably three, different groups on the basis of the detected property, in particular the detected property value. For example, each group is assigned a different value range and each sorting object 1 is assigned to one of the groups, so that the property value of the respective sorting object 1 lies in the value range assigned to the respective group. Exemplarily, the sorting objects 1 can be divided into first sorting objects 1A, second sorting objects 1B and third sorting objects 10 on the basis of the detected property. Based on the respective property value, the first sorting objects 1A are assigned to a first group, the second sorting objects 1B to a second group and the third sorting objects 10 to a third group.

The sorting system 10 comprises a valve arrangement 3 configured to blow at the sorting object 1, in particular each sorting object 1, to convey the sorting object 1, in particular each sorting object 1, to one of a plurality of possible sorting destinations 4. Expediently, the control device 11 is configured to control the valve arrangement 3 to cause the sorting objects 1 to be blown on by the valve arrangement 3.

The valve arrangement 3 comprises at least one valve 5, in particular a pneumatic valve. Exemplarily, the valve arrangement 3 comprises a plurality of valves 5, in particular pneumatic valves. For the sake of visibility, not all valves are provided with the reference sign "5" in FIG. 1. Preferably, the valve arrangement 3 comprises at least 10, at least 50, at least 100 or at least 200 valves. Exemplarily, the valves 5 are arranged next to each other in a line-up direction. Exemplarily, the line-up direction runs transversely to the conveying direction 14 and/or in the x-direction. Expediently, the valves 5 are arranged over the entire width of the sorting section 7. According to a possible embodiment, the valves 5 may be arranged in a plurality of rows extending in the x-direction, the rows being arranged one below the other in the z-direction. In particular, the valves 5 may be arranged distributed in an x-y plane. Preferably, the valve arrangement 3 comprises a sorting strip in which the valves 5 open out.

The valve arrangement 3 is arranged at the sorting section 7 so that the sorting objects 1 move past the valve arrangement 3 when the sorting objects 1 are conveyed in conveying direction 14. Exemplarily, the sorting objects 1 fall past the valve arrangement 3 on their way from the sorting object source 12 to the sorting destinations 4. Moving the sorting objects 1 past the valve arrangement 3 into the sorting destinations 4 shall be referred to as a sorting operation.

The sorting system 10 is capable, while the sorting objects 1 are moved past the valve arrangement 3, of blowing on each of the sorting objects 1 individually with a respective valve 5 of the valve arrangement 3 in order to influence the paths of movement of the sorting objects 1 so that each of the sorting objects 1 is moved to the sorting destination 4 specified for the respective sorting object 1. Based on the sensor signal from the sensor unit 2, the control device 11 assigns each sorting object 1 to one of the sorting destinations 4 such that the sorting objects are distributed to different sorting destinations 4 according to the detected property. The control device 11 controls the valve arrangement 3, in particular the valves 5 of the valve arrangement 3, in such a way that the valve arrangement 3 causes each sorting object 1 to be conveyed to the respectively assigned sorting destination 4. The assignment of the sorting objects 1 to the sorting destinations 4 takes place, for example, in accordance with the assignment to the various groups explained above.

The sorting system 10 is expediently designed to provide with the valve arrangement 3, in particular with each valve 5, an air blast in order to change a movement path of a respective sorting object 1 in such a way that the respective sorting object 1 is conveyed into the sorting destination 4 assigned to the respective sorting object 1. Thus, the sorting system 10 nudges the sorting objects 1 via respective air blasts. In particular, the sorting system 10 deflects the sorting objects 1 via respective air blasts. Exemplarily, the deflections and/or the air blasts occur in a horizontal direction, in particular in a y-direction. The direction of the air blasts and/or the deflections shall also be referred to as sorting direction 15. A respective air blast lasts exemplarily 1 ms to 10 ms.

Exemplarily, the sorting system 10 assigns the sorting objects 1 to at least three different sorting destinations 4 based on the detected property. The sorting system 10 assigns the first sorting objects 1A to a first sorting destination 4A. Furthermore, the sorting system 10 assigns the second sorting objects 1B to a second sorting destination 4B. Optionally, the sorting system 10 assigns the third sorting objects 10 to a third sorting destination 4C.

Purely by way of example, the property on the basis of which the sorting objects 1 are assigned to the various sorting destinations 4 is the size of the sorting objects 1. The first sorting objects 1A have a property value, in particular a size value, in a first value range, the second sorting objects 1B have a property value, in particular a size value, in a second value range, and the third sorting objects have a property value, in particular a size value, in a third value range. The three value ranges mentioned are expediently not overlapping. Purely exemplarily, the first sorting objects 1A are larger than the second sorting objects 1B, and the second sorting objects 1B are larger than the third sorting objects 10.

The sorting destinations 4 exemplarily comprise the first sorting destination 4A, the second sorting destination 4B and the third sorting destination 4C. The sorting destinations 4 are expediently arranged next to each other in a horizontal direction, exemplarily in y-direction. In particular, the sorting destinations 4 are arranged next to each other in sorting direction 15.

According to an alternative embodiment, there may also be only two sorting destinations 4, for example the first sorting destination 4A and the second sorting destination 4B, or the second sorting destination 4B and the third sorting destination 4C. In this embodiment, the sorting system 10 distributes the sorting objects to two different sorting destinations 4.

The sorting system 10 is configured to blow the sorting objects 1 with the valve arrangement 3 with different strengths to cause the sorting objects 1 to be distributed to the different sorting destinations 4.

The sorting system 10 is configured to selectively set, according to the detected property, the blowing strength 8 to a first blowing strength 8A greater than zero or a second blowing strength 8B greater than zero, the second blowing strength being different from the first blowing strength, and to blow a respective sorting object 1 using the valve arrangement 3 with the set blowing strength to cause the sorting object 1 to be conveyed to the sorting destination 4. The sorting system 10 thus sets the blowing strength 8 used in blowing the sorting object 1 to one of at least two different available blowing strengths 8A, 8B, both available blowing strengths being greater than zero.

Thus, by means of the valve arrangement 3, in particular by means of the valves 5, the sorting system 10 is configured to nudge each first sorting object 1A with a respective air blast having a first blowing strength 8A to cause each first sorting object 1A to be conveyed into the first sorting destination 4A. Exemplarily, each first sorting object 1A is nudged by a respective single valve 5 with a respective blast of air having a first blowing strength 8A. For example, the blowing strength 8 is the flow rate, i.e., the volume per time, of air output for one air blast from a valve 5.

Further, the sorting system 10 is configured to nudge, by means of the valve arrangement 3, in particular by means of the valves 5, each second sorting object 1B with a respective air blast having a second blowing strength 8B to cause each second sorting object 1B to be conveyed into the second sorting destination 4B. By way of example, each second sorting object 1B is nudged by a respective single valve 5 with a respective air blast with the second blowing strength 8B.

The first blowing strength 8A and the second blowing strength 8B are both greater than zero. The first blowing strength 8A and the second blowing strength 8B differ from each other. Exemplarily, the second blowing strength 8B is smaller than the first blowing strength 8A, in particular the second blowing strength 8B is at most 70% or at most 50% of the first blowing strength 8A. Alternatively, the first blowing strength is smaller than the second blowing strength, in particular the first blowing strength is a maximum of 70% or a maximum of 50% of the second blowing strength.

Exemplarily, the valve arrangement 3 comprises a plurality of valves 5, and the sorting system 10, 20 is configured to selectively set, for each of the valves 5, the blowing strength 8 to the first blowing strength 8A or the second blowing strength 8B, and to blow, with each of the valves 5, a respective sorting object 1 out of a plurality of sorting objects 1 with the respective set blowing strength 8 to cause the respective sorting object 1 to be conveyed to a respective sorting destination 4 out of a plurality of sorting destinations 4.

For each sorting object 1 to be blown on, the control device 11 expediently determines a respective valve 5 with which the respective sorting object 1 is to be blown on (for example, on the basis of a position of the respective sorting object 1 detected in particular with the sensor unit 2). The control device 11 expediently determines for each sorting object 1 to be blown on a respective blowing strength 8 with which the respective sorting object 1 is to be blown on. For each sorting object 1 to be blown on, the control device 11 also determines a respective blowing time at which the respective sorting object 1 is to be blown on. Preferably, the control device 11 is configured to control the valve arrangement 3 according to the determined valve 5, the determined blowing strength 8 and/or the determined blowing time in order to cause the respective sorting object 1 to be blown at the determined blowing time by the determined valve 5 with the determined blowing strength 8.

Preferably, the sorting system 10 comprises at least three different sorting destinations 4A, 4B, 4C, wherein the sorting system 10 is configured to selectively set the blowing strength 8 to the first blowing strength 8A, the second blowing strength 8B, or a third blowing strength 8C different from the first and second blowing strengths 8A, 8B, each of the three blowing strengths being assigned to a respective sorting destination 4A, 4B, 4C and being suitable for conveying the sorting object 1 to the respectively assigned sorting destination 4, 4A, 4B, 4C.

Exemplarily, the sorting system 10 is configured to set the respective blowing strength 8 to a third blowing strength 8C for each third sorting object 10 to cause each third sorting object 10 to be conveyed to the third sorting destination 4C. Exemplarily, the third blowing strength 8C is zero. Exemplarily, then, the sorting system 10 is configured not to deflect the third sorting objects 10 by means of air blasts. Exemplarily, the third sorting objects 10 fall downwards into the third sorting destination 4C, in particular without the sorting objects 10 being deflected by an air blast from the valve arrangement 3. According to an alternative embodiment, the third blowing strength may be greater than zero.

As can be seen from FIG. 2, the sorting system 10 is designed to blow the various sorting objects 1A, 1B, 10 on the sorting section 7 via the valve arrangement 3 to different extents in the sorting direction 15 and thereby deflect them to different extents, so that the sorting objects 1A, 1B, 10 are moved, in particular fall, into the different sorting destinations 4A, 4B, 4C. Exemplarily, the sorting system 10 blows the first sorting objects 1A more strongly than the second sorting objects 1B and thereby deflects the first sorting objects 1A more strongly than the second sorting objects 1B. Exemplarily, the sorting system 10 blows the second sorting objects 1B more strongly than the third sorting objects 10 and thereby deflects the second sorting objects more than the third sorting objects 10. Exemplarily, the sorting system 10 does not blow on the third sorting objects 10 and expediently does not deflect them.

Preferably, the valve 5 that serves to provide the first and the second blowing strength 8A, 8B is designed as a proportional valve. Exemplarily, each valve 5 is designed as a respective proportional valve. For example, the valve 5, in particular each valve 5, is a piezo valve.

In particular, a proportional valve is used for each valve 5 (instead of the switching valve used in the conventional sorting system). The proportional valve can also be referred to as a proportional actuator and is preferably a piezo valve. Preferably, the proportional valve does not have a closed control loop or is not part of a closed control loop.

Exemplarily, the valve arrangement 3 comprises at least one valve member 6 and is designed to move the valve member 6 into a non-closed first valve member position in order to provide the first blowing strength 8A. Further, the valve arrangement 3 is configured to move the valve member 6 into a non-closed second valve member position different from the first valve member position to provide the second blowing strength 8B. Preferably, the valve arrangement 3 is further configured to move the valve member into a closed third valve member position to provide the third blowing strength 8C.

Exemplarily, each valve 5 comprises a respective valve member 6, which is selectively movable into the first valve member position to provide the first blowing strength 8A, or into the second valve member position to provide the second blowing strength 8B. Preferably, each valve member 6 is further movable into the third valve member position to provide the third blowing strength 8C.

Preferably, the sorting system 10 is designed to control the valve arrangement 3, in particular a respective valve 5, with a first electrical voltage 9A different from zero in order to provide the first blowing strength 8A, and to control the valve arrangement 3, in particular the respective valve 5, with a second electrical voltage 9B different from zero, which is different from the first electrical voltage 9A, in order to provide the second blowing strength 8B.

In particular, the sorting system 10 is designed to control each valve 5 with a respective voltage in order to set the respective blowing strength 8 of the respective valve 5.

If the respective valve 5 is controlled with a lower electrical voltage, this results in a lower flow rate at the output of the valve 5—and thus a lower blowing strength—than if the valve 5 is controlled with a higher electrical voltage. In a purely exemplary manner, the sorting system 10 is designed to control the respective valve 5 with an electrical voltage of 100V in order to achieve a flow rate of 7 l/min as blowing strength 8, to control the respective valve 5 with an electrical voltage of 150V in order to achieve a flow rate of 14 l/min as blowing strength 8 and/or to control the respective valve 5 with an electrical voltage of 250V in order to achieve a flow rate of 25 l/min as blowing strength 8.

Figure 3:
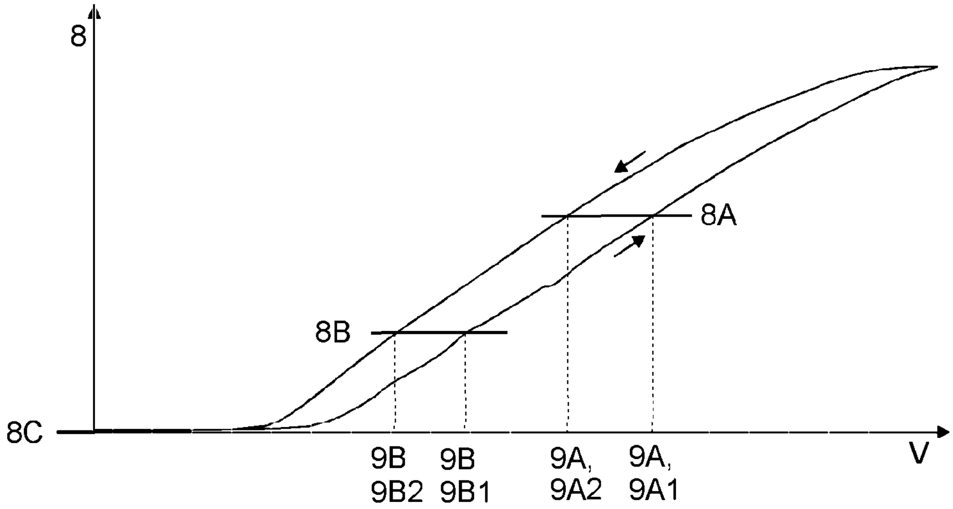
FIG. 3 shows a diagram of the blowing strength as a function of an electrical voltage.

FIG. 3 shows a diagram of the blowing strength 8 as a function of an electrical voltage with which a respective valve 5 (in particular a piezo valve) is controlled. Exemplarily, the blowing strength is a flow rate, so that the diagram can also be referred to as a flow rate characteristic curve. The diagram shows the course of the blowing strength 8, in particular the flow rate, when the electrical voltage of the respective valve 5 is continuously raised from 0V to a maximum voltage, for example 250V (right branch of the curve) and then lowered back to 0 (left branch of the curve). The blowing strength, in particular the flow rate, increases substantially linearly with the electrical voltage and decreases substantially linearly with the voltage. The blowing strength, in particular the flow rate, is subject to hysteresis—depending on whether a blowing strength, in particular a flow rate, is to be reached starting from 0V or from the maximum voltage, a different voltage is required. Thus, for the same blowing strength starting from the maximum voltage, a lower voltage is required than when starting from 0V.

If the voltage is increased to reach the first blowing strength 8A (in particular from 0V), a first voltage 9A with a first voltage value 9A1 is required. If to reach the first blowing strength 8A the voltage is decreased (in particular from the maximum voltage), a first voltage 9A with a second voltage value 9A2 is required, which is exemplarily smaller than the first voltage 9A with the first voltage value 9A1. If to reach the second blowing strength 8B the voltage is increased (in particular from 0V), a second voltage 9B with a first voltage value 9B1 is required, which is exemplarily smaller than the first voltage 9A with the second voltage value. If to reach the second blowing strength 8B the voltage is decreased (in particular from the maximum voltage), a second voltage 9B with a second voltage value 9B2 is required, which is exemplarily smaller than the second voltage 9B with the first voltage value 9B1.

Preferably, the sorting system is configured to determine, as each electrical voltage is provided to each valve 5, whether a respective voltage increase or a respective voltage decrease is required to reach the electrical voltage and, based on this determination, to select the voltage value of the electrical voltage so as to compensate for the hysteresis.

Preferably, the sorting system 10 is configured to perform an open-loop control, and not a closed-loop control, of the valve member position for displacing each valve member 6 into the first valve member position and into the second valve member position. In particular, the sorting system 10 does not comprise and/or use any sensor system to detect the position of the respective valve member 6. In particular, there is no detection and/or feedback of the valve member position.

According to an alternative embodiment, the sorting system 10 is designed to perform a closed-loop control of the valve member position for displacing each valve member 6 into the first valve member position and into the second valve member position. In an exemplary embodiment, the sorting system 10 has a sensor system for detecting the position of the respective valve member 6 and for taking this into account via a feedback loop when controlling the respective valve 5. The sensor system comprises, for example, a Hall sensor and a corresponding magnet on the valve member 6. Furthermore, the sensor system may comprise a stroke sensor, a pressure sensor and/or a flow sensor.

Preferably, the sorting system 10 is designed to adjust the respective blowing strength 8 according to the detected property, for example the weight, in such a way that an influence of the detected property on the conveyance to be effected by the blowing, in particular the deflection to be effected, is compensated. Exemplarily, the detected property is the size, the weight or the shape of the sorting object 1 and influences how far the respective sorting object 1 is conveyed in the sorting direction 15 by a given blowing strength 8. The sorting system 10 is expediently designed to increase the respective blowing strength 8 for a sorting object 1 in response to the fact that a larger size and/or a higher weight is detected as the property for the sorting object 1, and is further designed to lower the respective blowing strength 8 for the sorting object 1 in response to the fact that a smaller size and/or a lower weight is detected as the property for the sorting object 1.

In particular, the sorting system 10 is designed to set for two sorting objects 1 for which different property values are detected for the property, for example two sorting objects 1 of different size or different weight, the respective blowing strengths on the basis of the detected property in such a way that each of the two sorting objects 1 is blown on with a different blowing strength 8 greater than zero, so that expediently both sorting objects 1 are conveyed to the same sorting destination 4 by the blowing on.

For example, the sorting system 10 detects a larger size and/or a higher weight as the property for a first sorting object 1A than for a second sorting object 1B, and blows on the first sorting object 1A with a first blowing strength 8A that is larger than a second blowing strength 8B with which the second sorting object 1B is blown on, based on the respective detected property, expediently in such a way that both sorting objects 1 are conveyed to the same sorting destination 4.

Preferably, the sorting system 10 is designed to move the respective valve member 6 directly from the first valve member position to the second valve member position or to move the respective valve member 6 directly from the second valve member position to the first valve member position. In particular, the sorting system 10 is configured not to assume a closed valve member position during the change between the first valve member position and the second valve member position. In particular, the sorting system 10 is configured to switch directly from the first electrical voltage 9A to the second electrical voltage 9B or directly from the second voltage 9B to the first voltage 9A when controlling the respective valve 5. As explained above, the respective valve 5 is in particular a piezo valve which may have a hysteresis. Preferably, the sorting system 10 is configured to take into account a hysteresis of the piezo valve when controlling the piezo valve to provide the first and/or second blowing strength 8A, 8B.

Preferably, the sorting system 10 is designed to temporally vary the respective blowing strength 8 with which the respective sorting object 1 is blown on according to a predetermined blowing profile. The predetermined blowing profile comprises, in particular, a temporal sequence of blowing strengths 8 for a respective air blast with which a respective sorting object 1 is blown. For example, the blowing profile comprises a time sequence of the second blowing strength 8B followed by the first blowing strength 8A. Thus, in particular, the blowing profile comprises a temporal sequence of a smaller blowing strength followed by a larger blowing strength. By means of such a blowing profile—i.e. by the fact that a respective sorting object 1 is blown by a respective valve 5 first with the smaller blowing strength and then with the larger blowing strength—a rotation of the sorting object otherwise caused by the blowing can preferably be prevented or reduced.

According to a preferred embodiment, the sorting system 10 is designed to check the result of the sorting, i.e. to check whether the sorting objects 1 have been correctly sorted into the sorting destinations 4 on the basis of their property, and to adjust at least one, preferably both, blowing strengths 8A, 8B on the basis of this check. Expediently, the sorting system comprises an artificial intelligence component, for example an artificial neural network, which expediently maps a relationship between the result of the sorting and the blowing strengths 8A, 8B, and is designed to use this artificial intelligence component to adjust the blowing strengths 8A, 8B on the basis of the sorting result.

Figure 4:
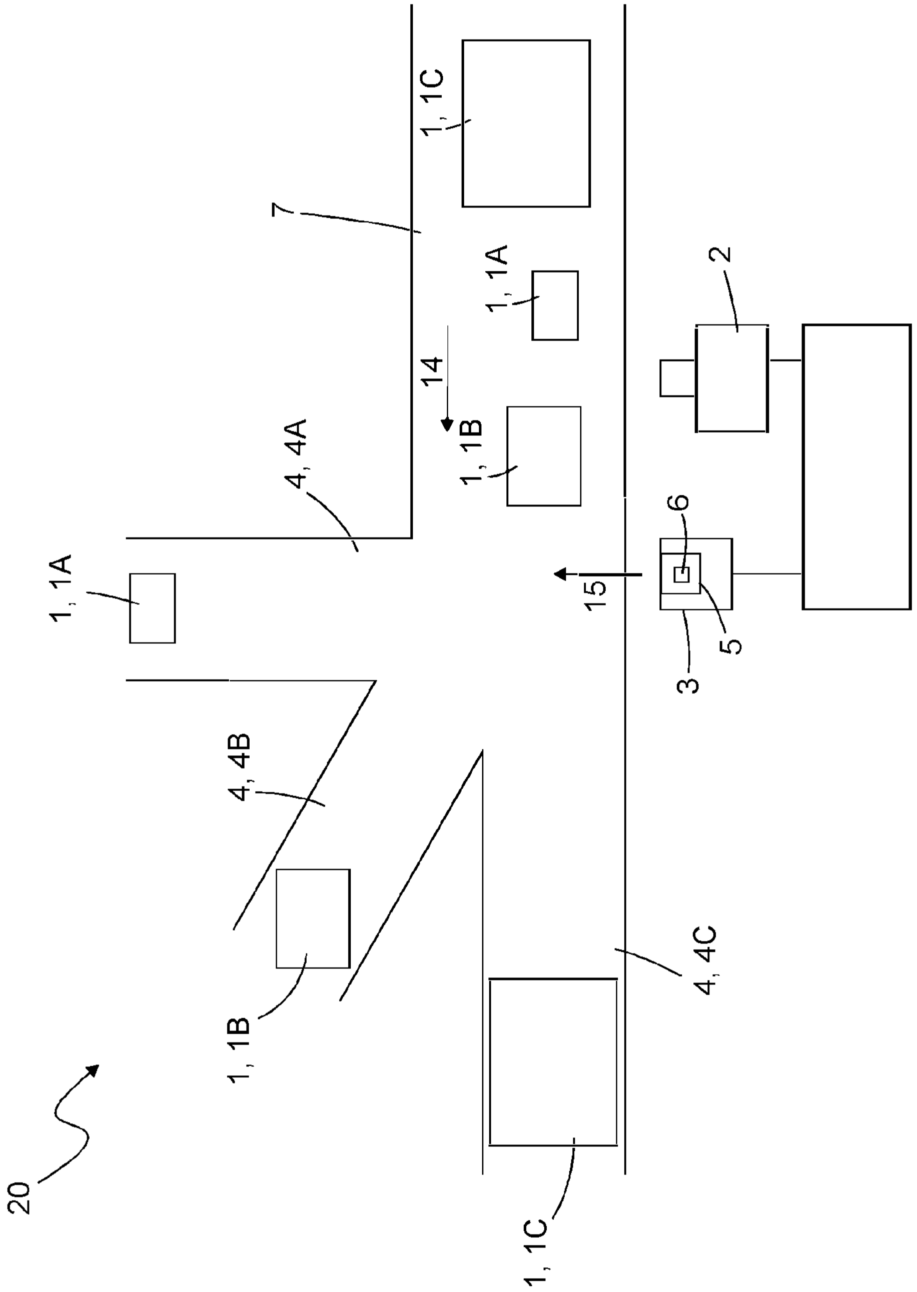
FIG. 4 shows a sorting system according to a second embodiment in a top view.

FIG. 4 shows a sorting system 20 according to a second embodiment. Except for the differences explained below, the sorting system 20 is designed in the same way as the sorting system 10, so that the explanations relating to the sorting system 10 preferably also apply to the sorting system 20.

Exemplarily, the sorting objects 1 in the sorting system 20 are transport goods, for example packages. Furthermore, the sorting system 20 has a sorting section 7, in particular a conveyor belt, over which the sorting objects 1 are moved. The conveyor belt moves the sorting objects 1 in a conveying direction 14, which is exemplarily a horizontal conveying direction. The sorting system 20 is configured to blow the sorting objects 1 on the sorting section 7 with the valve arrangement 3, in order to convey the sorting objects 1 to different sorting destinations 4. In particular, the sorting system 20 is configured to blow the sorting objects 1 in a sorting direction 15 to deflect the sorting objects 1 in the sorting direction 15, thereby causing the sorting objects 1 to be conveyed to the various sorting destinations 4. The sorting direction 15 is preferably a horizontal direction and runs in particular orthogonally to the conveying direction

14. The sorting destinations 4 are exemplary different conveying routes into which the sorting section 7 is divided.

The sorting system 20 comprises a sensor unit 2 for detecting a property, in particular a size, shape, weight, color and/or material, of a sorting object 1, as well as a valve arrangement 3, which is designed to blow on the sorting object 1 in order to convey the sorting object 1 to one of several possible sorting destinations 4. The sorting system 20 is adapted to selectively set, according to the detected property, a blowing strength 8 to a first blowing strength 8A greater than zero or to a second blowing strength greater than zero, the second blowing strength being different from the first blowing strength 8B, and to blow the sorting object 1 using the valve arrangement 3 with the set blowing strength to cause the sorting object 1 to be conveyed to the sorting destination 4.

According to a preferred embodiment, the sorting system 10, 20 is configured to set the first blowing strength 8A as the default blowing strength for the valve 5 and then, when the sorting system 10, 20 determines on the basis of the detected property that a sorting object 1 is to be blown at the second blowing strength 8B, to lower the blowing strength 8 of the valve 5 directly from the first blowing strength 8A to the second blowing strength 8B. Exemplarily, the sorting system 10, 20 is configured to keep the valve 5 permanently in an open state so that the valve 5 permanently discharges air and, by means of the discharged air, permanently blows at sorting objects 1 located on the sorting section 7, and to selectively set the blowing strength to the first blowing strength 8A or the second blowing strength 8B based on the detected property of the sorting objects 1.

Preferably, the sorting system 10, 20 is designed to take into account, when controlling the valve 5, how long the valve 5 has already been open, in order to compensate in this way, in particular, for a drift behavior that would otherwise cause the blowing strength to change (in an undesirable manner).

Figure 5:
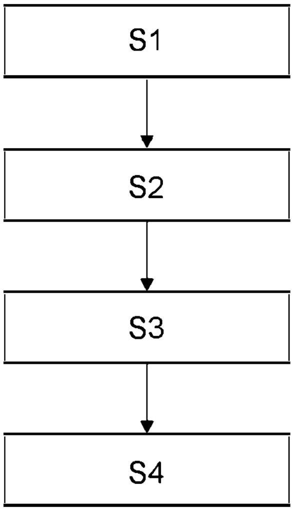
FIG. 5 shows a flowchart of a method for sorting sorting objects.

FIG. 5 shows a flowchart of a sorting method for sorting sorting objects 1. The sorting method is expediently performed with the sorting system 10 or the sorting system 20.

The sorting method comprises a first step S1, in which a property, in particular a size, shape, weight, color and/or material, of a first sorting object 1A is detected, in particular by means of the sensor unit 2.

The sorting method further comprises a second step S2 in which, based on the detected property of the first sorting object 1A and using a valve arrangement 3, in particular a valve 5 of the valve arrangement 3, a first blowing of the first sorting object 1A with a first blowing strength 8A greater than zero is performed to convey the first sorting object 1A to a first sorting destination 4A.

The sorting method further comprises a third step S3 in which the property of a second sorting object 1B is detected, in particular by means of the sensor unit 2.

The sorting method further comprises a fourth step S4 in which, based on the detected property of the second sorting object 1B and using the valve arrangement 3, in particular the valve 5, a second blowing of the second sorting object 1B with a second blowing strength 8B different from the first blowing strength 8A, the second blowing strength 8B being greater than zero, is performed to convey the second sorting object 1B to a second sorting destination 4B or to the first sorting destination 4A.

The invention claimed is:

1. A sorting system for sorting objects, comprising a sensor unit for detecting a property of a sorting object, and a valve arrangement which is adapted to blow on the sorting object in order to convey the sorting object to one of a plurality of possible sorting destinations, wherein the sorting system is adapted to selectively set, according to the detected property, a blowing strength to a first blowing strength greater than zero or to a second blowing strength greater than zero, the second blowing strength being different from the first blowing strength, and to blow the sorting object using the valve arrangement with the set blowing strength to cause the sorting object to be conveyed to the sorting destination, and wherein the valve arrangement comprises a valve designed as a proportional valve for providing the first and the second blowing strengths, and wherein the sorting system is adapted to control the valve arrangement with a first electrical voltage different from zero in order to provide the first blowing strength and to control the valve arrangement with a second electrical voltage different from zero in order to provide the second blowing strength, both the first electrical voltage and the second electrical voltage being above 0 V, and wherein the proportional valve is a piezo valve.

2. The sorting system according to claim 1, wherein the valve arrangement comprises a plurality of valves, and the sorting system is adapted to selectively set the blowing strength of each of the valves to the first blowing strength or the second blowing strength, and to blow, with each of the valves, a respective sorting object among a plurality of sorting objects with the respective set blowing strength to cause the respective sorting object to be conveyed to a respective sorting destination among a plurality of sorting destinations.

3. The sorting system according to claim 1, comprising at least three different sorting destinations, wherein the sorting system is adapted to selectively set the blowing strength to the first blowing strength, the second blowing strength, or a third blowing strength different from the first and second blowing strengths, each of the three blowing strengths being assigned to a respective sorting destination and being suitable for conveying the sorting object to the respectively assigned sorting destination.

4. The sorting system according to claim 1, wherein the sorting system is adapted to adjust the blowing strength according to the detected property, such that an influence of the detected property on the conveyance to be affected by the blowing is compensated.

5. The sorting system according to claim 1, wherein the valve arrangement comprises at least one valve member and is adapted to place the valve member in a non-closed first valve member position to provide the first blowing strength and to place the valve member in a non-closed second valve member position different from the first valve member position to provide the second blowing strength.

6. The sorting system according to claim 5, wherein the sorting system is configured to perform open-loop control, and not closed-loop control, of the valve member position to displace the valve member into the first valve member position and into the second valve member position.

7. The sorting system according to claim 5, wherein the sorting system is configured to move the valve member directly from the first valve member position to the second valve member position or to move the valve member directly from the second valve member position to the first valve member position.

8. The sorting system according to claim 1, wherein the sorting system is adapted to take into account a hysteresis of the piezo valve when actuating the piezo valve for providing the first and/or second blowing strength.

9. The sorting system according to claim 1, wherein the sorting system is adapted to temporally vary the blowing strength with which the sorting object is blown on according to a predetermined blowing profile, wherein the predetermined blowing profile comprises a temporal sequence of blowing strengths for a respective air blast with which a respective sorting object is blown.

10. The sorting system according to claim 1, wherein the sorting objects are bulk material, and wherein the sorting system has a sorting section, over which the sorting objects are moved, and wherein the sorting system is adapted to blow the sorting objects on the sorting section with the valve arrangement in order to convey the sorting objects to different sorting destinations.

11. The sorting system according to claim 10, wherein the sorting objects are foodstuffs.

12. The sorting system according to claim 10, wherein the sorting objects are moved over the sorting section by means of gravity.

13. The sorting system according to claim 1, wherein the sorting objects are transport goods, and wherein the sorting system has a sorting section over which the sorting objects are moved, and wherein the sorting system is adapted to blow on the sorting objects on the sorting section with the valve arrangement in order to convey the sorting objects to different sorting destinations.

14. The sorting system according to claim 13, wherein the sorting objects are packages and the sorting section is a conveyor belt.

15. The sorting system according to claim 1, wherein the property comprises a size, shape, weight, color and/or material.

16. A sorting method for sorting objects, comprising the steps:

detecting a property of a first sorting object, based on the detected property of the first sorting object and using a valve arrangement comprising a proportional valve, first blowing of the first sorting object with a first blowing strength greater than zero to convey the first sorting object to a first sorting destination, detecting the property of a second sorting object, and based on the detected property of the second sorting object and using the valve arrangement, second blowing of the second sorting object with a second blowing strength different from the first blowing strength, the second blowing strength being greater than zero, to convey the second sorting object to a second sorting destination or to the first sorting destination, wherein the first blowing and the second blowing are each provided by the proportional valve being a piezo valve, and wherein the step of first blowing comprises the application of a first electrical voltage different from zero to the valve arrangement in order to provide the first blowing strength and wherein the step of second blowing comprises the application of a second electrical voltage different from zero to the valve arrangement in order to provide the second blowing strength, both the first electrical voltage and the second electrical voltage being above 0 V.

* * * * *